(No Model.)  6 Sheets—Sheet 1.

S. T. STILES & C. E. DREW.
KNITTING MACHINE.

No. 547,902.  Patented Oct. 15, 1895.

Witnesses  Inventors
Sherman T. Stiles and
Charles E. Drew.

(No Model.) 6 Sheets—Sheet 2.
S. T. STILES & C. E. DREW.
KNITTING MACHINE.

No. 547,902. Patented Oct. 15, 1895.

Witnesses.
Lauritz N. Möller.
John A. Snow.

Inventors
Sherman T. Stiles and
Charles E. Drew,
by their attorneys.

(No Model.) 6 Sheets—Sheet 3.

S. T. STILES & C. E. DREW.
KNITTING MACHINE.

No. 547,902. Patented Oct. 15, 1895.

Witnesses.

Inventors
Sherman T. Stiles, and
Charles E. Drew,
by their attorneys,
Magradie & Beach (No Model.)  6 Sheets—Sheet 4.
S. T. STILES & C. E. DREW.
KNITTING MACHINE.
No. 547,902.  Patented Oct. 15, 1895.
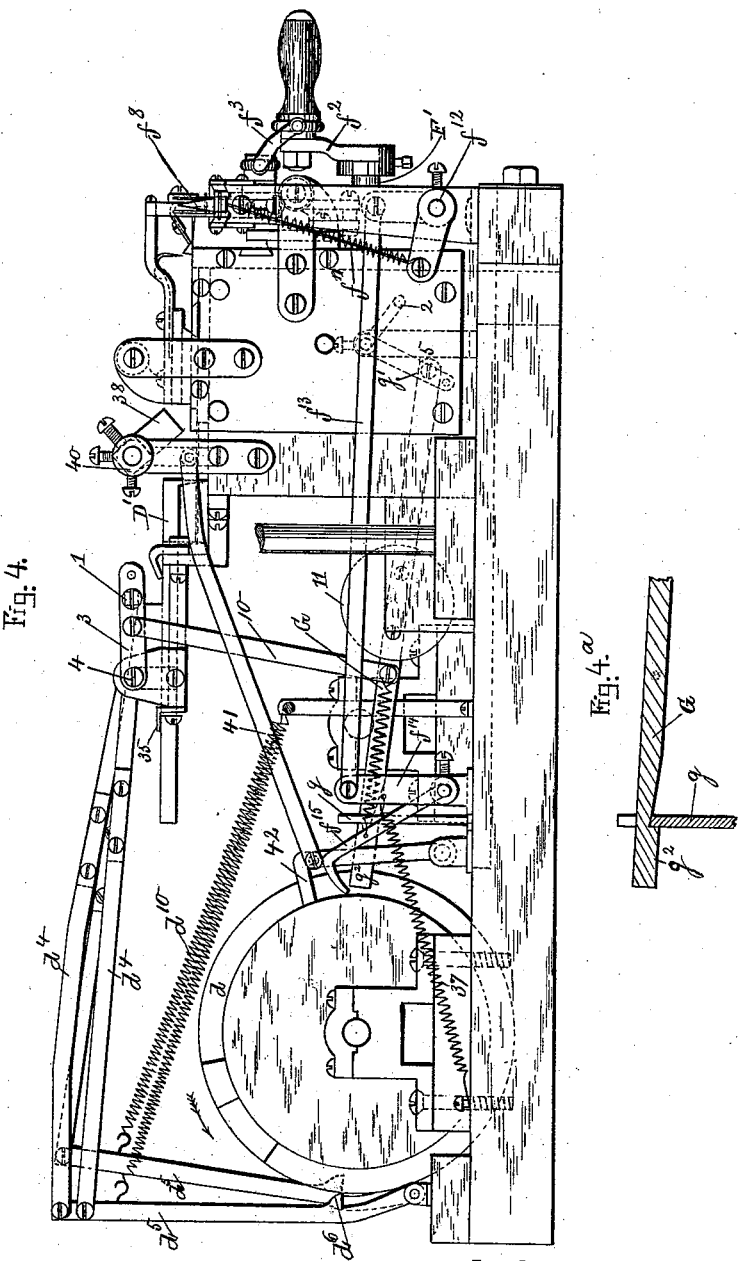
Witnesses.
Lauritz N. Möller.
John R. Snow
Inventors
Sherman T. Stiles and
Charles E. Drew
by their attorneys (No Model.)
S. T. STILES & C. E. DREW.
KNITTING MACHINE.
No. 547,902.                    Patented Oct. 15, 1895.
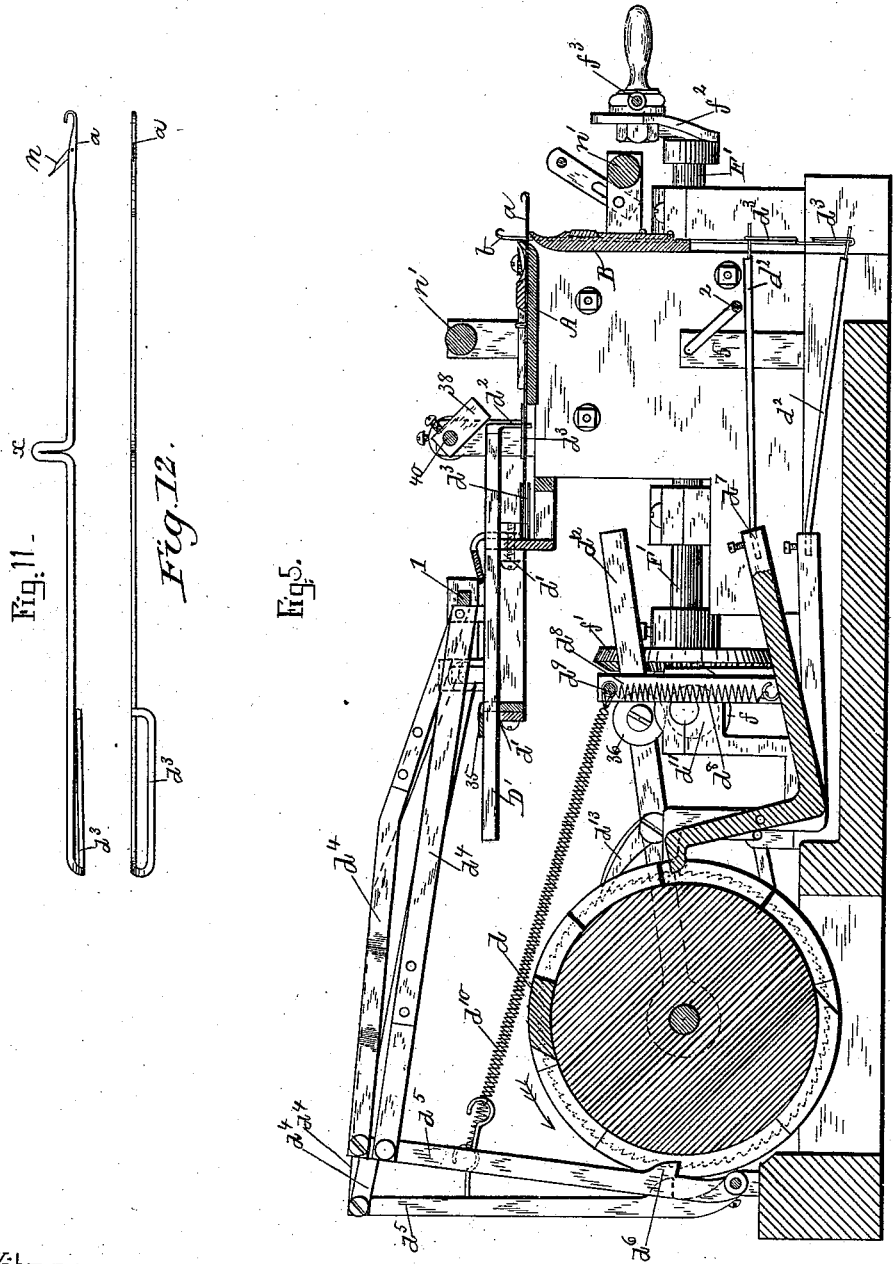
Witnesses.
Laurity N. Möller
John R. Snow
Inventors
Sherman T. Stiles, and
Charles E. Drew,
by their attorneys,
Maynadier & Bunn (No Model.) 6 Sheets—Sheet 6.
S. T. STILES & C. E. DREW.
KNITTING MACHINE.
No. 547,902. Patented Oct. 15, 1895.
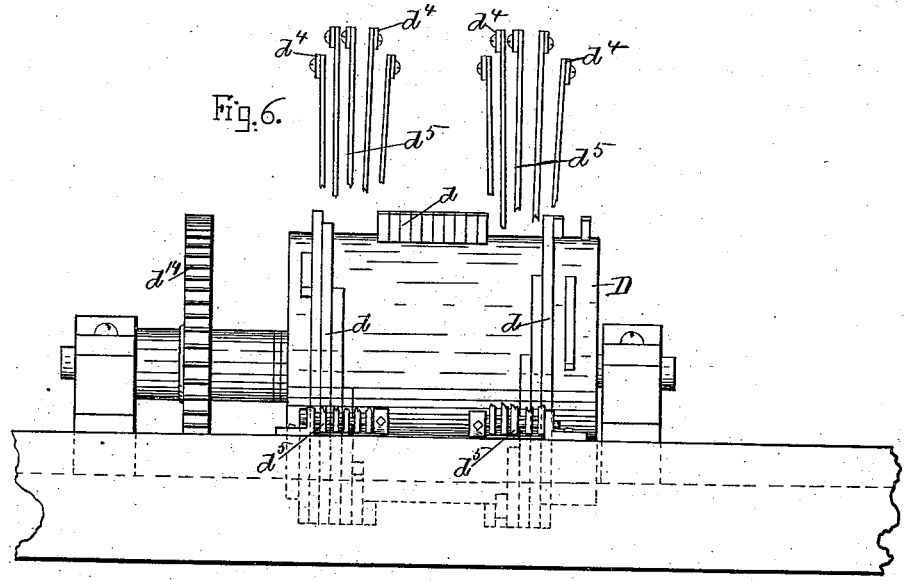
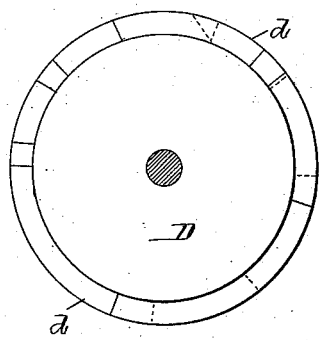
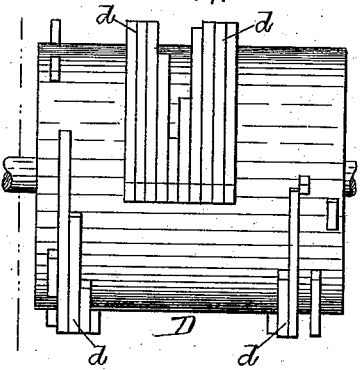
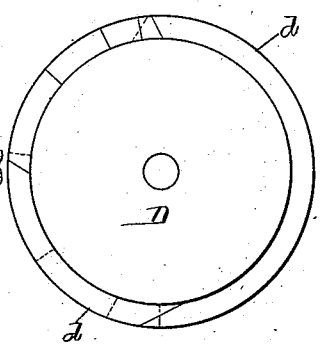
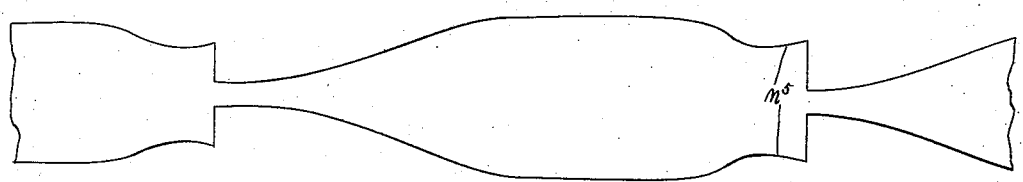
Witnesses.
Lauritz W. Möller
John R. Snow
Inventors
Sherman T. Stiles, and
Charles E. Drew.
by their attorneys,
Maynadier & Leach

UNITED STATES PATENT OFFICE.

SHERMAN T. STILES AND CHARLES E. DREW, OF WOONSOCKET, RHODE ISLAND, ASSIGNORS, BY DIRECT AND MESNE ASSIGNMENTS, TO GEORGE H. BAKER, OF SAME PLACE.

KNITTING-MACHINE.

SPECIFICATION forming part of Letters Patent No. 547,902, dated October 15, 1895.

Application filed October 11, 1889. Serial No. 326,755. (No model.)

*To all whom it may concern:*

Be it known that we, SHERMAN T. STILES and CHARLES E. DREW, of Woonsocket, in the county of Providence and State of Rhode Island, have invented a new and useful Knitting-Machine, of which the following is a specification, reference being had to the accompanying drawings, in which—

Figures 1, 10:
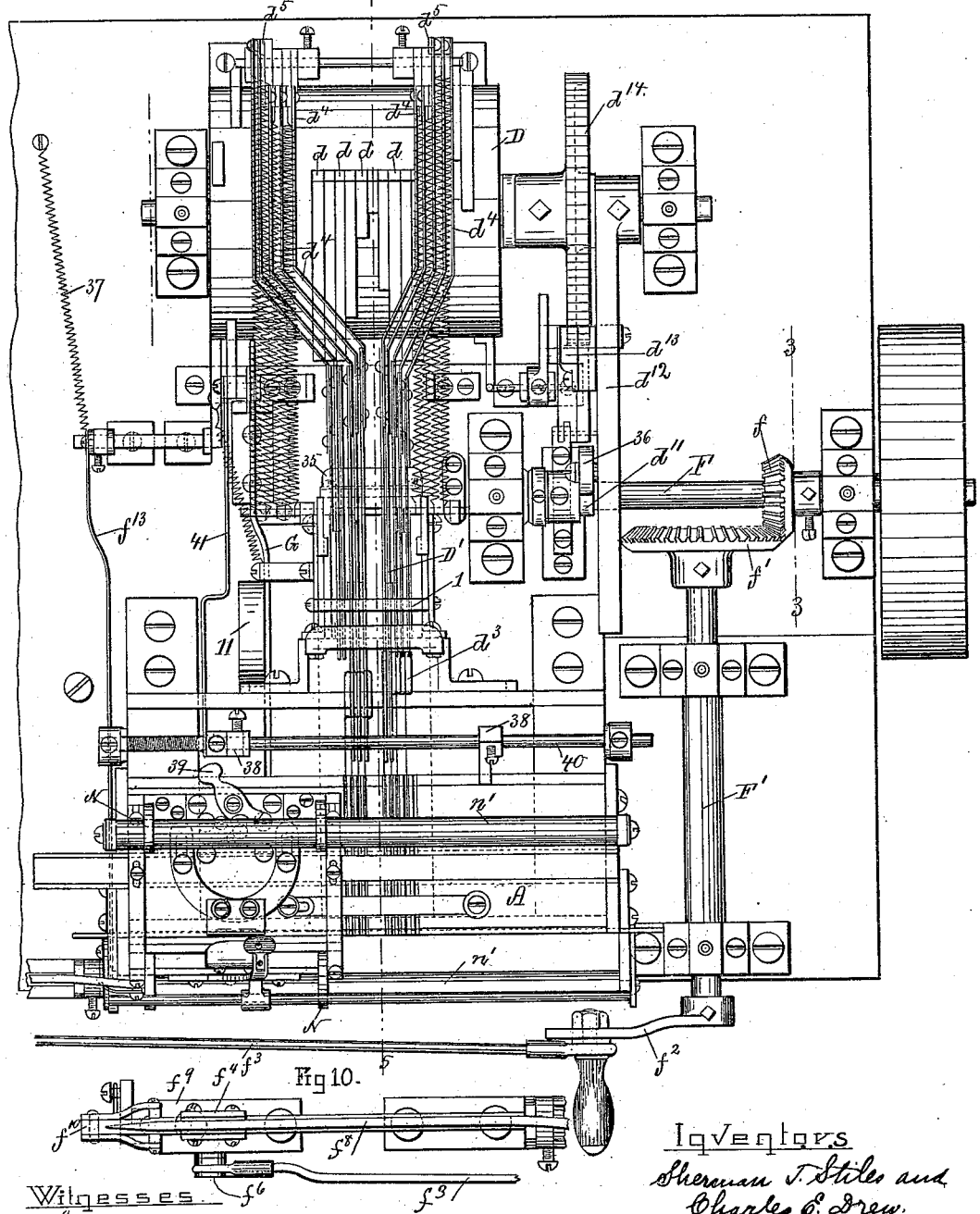
Figure 2:
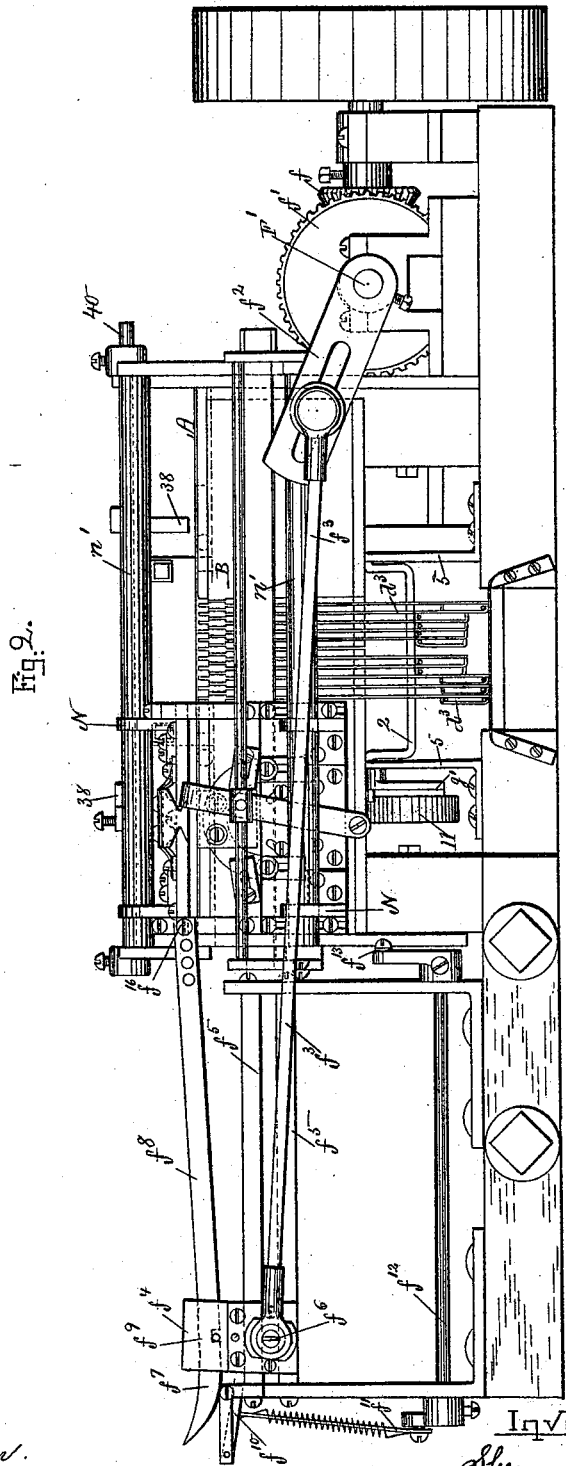
Figure 3:
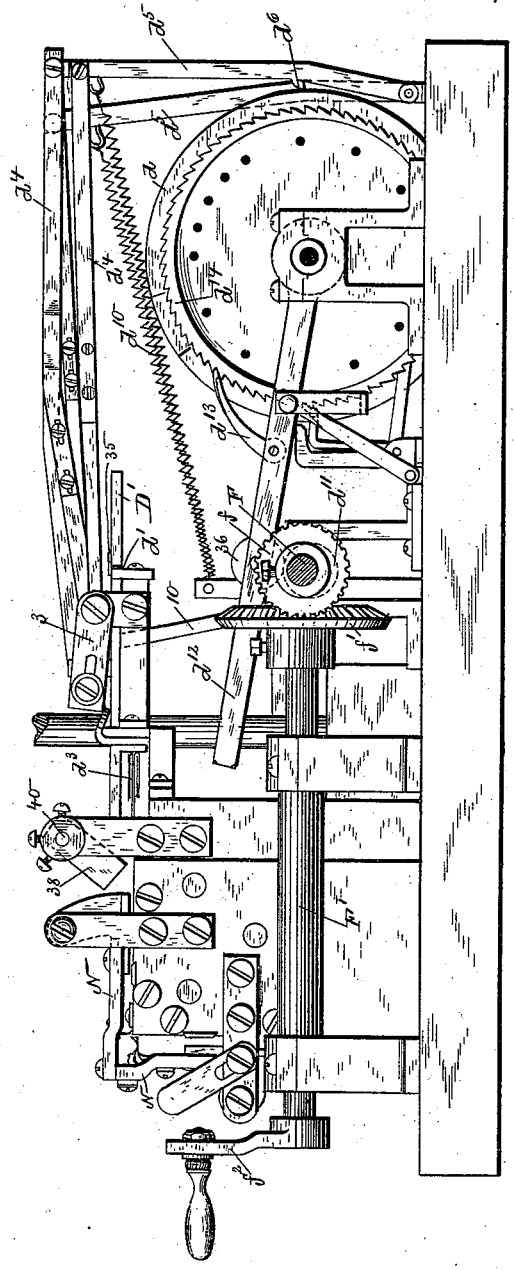

Figure 1 is a plan of one form of machine embodying our invention. Fig. 2 is a front elevation thereof. Fig. 3 is a side elevation and section on line 3 3 of Fig. 1. Fig. 4 is an elevation of the other side of the machine. Fig. 4$^a$ shows a hooked arm and its support. Fig. 5 is a sectional elevation on line 5 5 of Fig. 1. Fig. 6 is a rear elevation of the controlling-cam cylinder and showing the levers $d^5$, which are broken for greater clearness. Fig. 7 is an elevation, and Figs. 8 and 9 are end views, of the controlling cam-cylinder. Fig. 10, Sheet I, is a plan of part of the device used for stopping the carriage. Figs. 11 and 12 show our new needle in full size. Fig. 13 is a plan of a web of thumb-blanks.

The object of our invention is to produce a machine for automatically making a web of knitted flat blanks, which vary in width and are adapted to be separated to make finished articles—for example, thumb-blanks, mitten-blanks, &c.

Our invention consists in the combination of two sets of needles, each needle having an eye at its butt-end, with a controlling-cam or its equivalent, by means of a double set of fingers working in the eyes of each set of needles, one set of fingers being carried by connecting-levers controlled by the cam, the other set being carried by slides which are connected by rods to another set of levers controlled by the cam. The result of this organization is that series of knitted blanks of varying width may be made automatically. Heretofore series of knitted blanks varying in width have been produced on machines like the well-known Lamb machine; but the needles have been actuated by hand to widen the web, the stitches being cast off by hand.

In the drawings, in which we show our invention embodied in the best way now known to us, A is the top needle-bed, B the front needle-bed, and D the controlling-cam.

The construction of the needle-beds, the arrangement of the needles therein and cams for actuating the needles *a b* for making stitches, will be readily understood by all skilled in the art without particular description, the parts being old and well known. Needles *a* and *b* are controlled by controlling-cam D, which is so connected to the needles that the needles are automatically actuated to knit a series of blanks each varying in width, and at the completion of each blank to cast off stitches and so finish one blank and automatically begin another one of the series of blanks. Cam D is made up of a number of cam-surfaces $d$, supported in any suitable way—for example, on a cylinder, as shown—which control the needles by means of fingers $d^2$ of the slides D', which reciprocate in suitable ways—say, in the frame of the machine—these ways being conveniently formed, as shown, by slotting the frame at $d'$. The slides are kept in the slots by a cross-bar 35. Fingers $d^2$ enter eyes $d^3$ of the needles, and the slides D' are connected by rods $d^4$ to levers $d^5$, provided with cams $d^6$, which work with suitable cam-surfaces $d$ on controlling-cam D. Needles *b* are connected to the controlling-cam D by means of fingers $d^2$ and rocker-levers $d^7$ and springs $d^8$, the fingers $d^2$ working in the eyes $d^3$ of the needles *b* and springs $d^8$ connecting levers $d^7$ to a stationary cross-head $d^9$, mounted in the frame.

Our machine will be best understood from a description of its operation, which is as follows: Motion is imparted by driving-shaft F and its gear *f* to shaft F', provided with a gear *f'*, which meshes with the gear *f*. Shaft F' has a crank $f^2$, to which the carriage N, carrying the needle-driving cams and the yarn-guide (old and well-known parts) is connected by a rod $f^3$, through block $f^4$, sliding in ways $f^5$ and arm $f^8$, pivoted to the carriage. Rod $f^3$ is connected to block $f^4$ at $f^6$. Rotation of shaft F causes the controlling-cam D to rotate, cam $d^{11}$ on shaft F working with the pawl-carrier $d^{12}$, which carries a pawl $d^{13}$, which meshes with a ratchet $d^{14}$ on the shaft of the controlling-cam D. The pawl-carrier has a roller 36, which works with the cam $d^{11}$. Before the controlling-cam is rotated sufficiently far to remove the cam-surfaces $d$ out of the path of the levers $d^5\ d^7$, which are constantly pressed toward cylinder D by springs $d^8\ d^{10}$, a number of needles $a$ and $b$, commonly three, are operated in the usual way to make stitches. These three needles (or other number, as the nature of the work requires) occupy the middle portions of their respective beds and are always independent of the controlling-cam D. The widening-needles are brought into play at the proper time by being thrown forward and upward, respectively, by the force of springs $d^{10}\ d^8$, when the cam-surfaces $d$, which hold their controlling-levers back and down, respectively, are removed out of the path of the controlling-levers $d^5\ d^7$. The removal of cam-surfaces $d$ suffers springs $d^8\ d^{10}$ to throw connecting-rods $d^4$ against stop 1 and fingers $d^2$ against stop 2, the cam-surfaces upon levers $d^5\ d^7$ not coming into contact with the surface of cylinder D. (See Fig. 5.)

When the web has been widened as may be desired, the stitches upon widening-needles are cast off as follows: The cast-off is obtained at the proper time by means of a rod G, supported near one end by the bracket $g$ and connected at the other end to an arm $g'$, carrying stop 2. The free end of rod G engages a cam-surface $d$ on cam D, which lifts the tooth $g^2$ (see Fig. 4$^\text{a}$) out of the bracket $g$ and pushes the rod G so as to move arm $g'$ outwardly and raise stop 2, and through link 10 raise bracket 3, carrying stop 1 out of the path of rods $d^4$, the motion of arm $g'$ outwardly swinging stop 2 out of the path of fingers $d^2$. When stops 1 and 2 are performing their functions, the cam-surfaces on levers $d^5$ and $d^7$ are held from contact with the cylinder D. (See Fig. 5.) The removal of these stops permits springs $d^8\ d^{10}$ to act, and an additional motion is thus imparted to levers $d^5$ and $d^7$, and needles $a$ are thrown outward and needles $b$ upward, so that the stitches are left behind the latches $n$ of the needles. The controlling-cam then engages levers $d^5\ d^7$, Fig. 5, and draws the needles through the connections above described backward and downward, respectively, to cast off stitches. Cam-surface $d$ lifts rod G against the weight 11 and out against a spring (see Fig. 4) which returns rod G to its normal position when the cam-surface $d$ is removed, thus permitting stops 1 and 2 to return to place. While the cast-off is being made, the carriage N for the needle-cams and thread-guide is stationary, the hook $f^7$ on arm $f^8$ being thrown out of engagement with the pin $f^9$ in block $f^4$ by means of the lever $f^{10}$, actuated by a rod $f^{11}$, connected to an arm on rocker-shaft $f^{12}$.

The operation of the widening-needles will now be plain. They have three positions at different stages of the operation of knitting a blank. First, before they are put into operation they are held back and down respectively by the rods and fingers directly controlling them, which rods and fingers are themselves controlled by levers $d^5\ d^7$. Levers $d^5\ d^7$ carry cam-surfaces, which tend to come into contact with the surface of cylinder D under the stress of springs $d^{10}\ d^8$, but which in the first position of the widening-needles are kept from contact by the cams $d$. The second position of the widening-needles when they are brought into operation is obtained by removing the cams $d$. Springs $d^{10}$ then draw levers and rods $d^5\ d^4$ forward, pushing widening-needles $a$ forward until each rod $d^4$ brings up against stop 1, the cam-surface upon lever $d^5$ not coming in contact with cylinder D. At the same time, upon the removal of cam $d$, springs $d^8$ draw levers $d^7$, carrying fingers $d^2$, up until they bring up on stop 2, the cam-surfaces on levers $d^7$ not being in contact with the surface of cylinder D. The third position for the cast-off is obtained by removing stops 1 and 2 out of the paths of rods $d^4$ and fingers $d^2$, respectively, when springs $d^{10}$ and $d^8$ move levers $d^5$ and $d^7$ until their cam-surfaces bring up on the surface of cylinder D, the widening-needles being by this operation forced outwardly and upwardly, respectively, as above explained, so that the stitches are left behind the latches of the needles, and when the cam-surfaces $d$ move levers $d^5\ d^7$ in due course the needles are withdrawn to their first position. Rocker-shaft $f^{12}$ is connected by a link $f^{13}$, Figs. 2 and 4, to rocker-arm $f^{14}$, provided with a dog $f^{15}$, which engages a cam-surface $d$ on controlling-cam D. Rocker-arm $f^{14}$ is rocked away from the controlling-cam against the force of a spring 37. Arm $f^8$ is connected at $f^{16}$ to the needle-cam carriage N, sliding on the supports $n'$. Needles $b$ are drawn downwardly by the engagement of the levers $d^7$ with cam-surfaces $d$, and needles $a$ are drawn inwardly by engagement of cams $d^6$ with cam-surfaces $d$, being drawn inwardly against the force of springs $d^{10}$, while needles $b$ are draw downwardly against the force of springs $d^8$. As fast as the levers $d^7$ pass out of engagement with their cam-surfaces $d$, springs $d^8$ move the needles outwardly. The rods $d^4$ are arrested in their forward movement by a stop 1, the levers $d^7$ being arrested by the stop 2. Stop 1 is a cross-bar in a bracket 3, journaled at 4. Stop 2 is a rocker journaled in supports 5 and it is on this stop that the rocker-arm $g'$, to which rod G is connected, is fast. The free end of rod G is in position to engage a cam-surface $d$, and when stop 2 is in its lowest position the hook $g^2$ engages a slotted support $g$. (See Fig. 4$^\text{a}$.)

The needle-cams carried by carriage N are shifted by means of dogs 38, which engage the usual needle-cam shifter 39. Dogs 38 are mounted on the rocker-shaft 40, which is actuated by controlling-cam D, through rod 41 and dog 42. The operation and arrangement of the cams and dogs will be fully understood by reference to patent to Drew, No. 342,339, dated May 25, 1886.

What we claim as our invention is—

In a kitting machine the combination of two sets of needles each with an eye at its butt end; fingers for the eyes of each set of needles; a double set of connections, one for each set of fingers; and a controlling cam operating through the double set of connections to control each needle; all combined and operating substantially as described.

SHERMAN T. STILES.
CHARLES E. DREW.

Witnesses:
   WALTER I. BALLOU,
   ERWIN J. FRAME.